(12) United States Patent
Matias et al.

(10) Patent No.: US 11,805,208 B2
(45) Date of Patent: Oct. 31, 2023

(54) AUTOMATICALLY PERFORMING ACTIONS BY A MOBILE COMPUTING DEVICE

(71) Applicant: Google LLC, Mountain View, CA (US)

(72) Inventors: Shavit Matias, Tel Aviv (IL); Noam Etzion-Rosenberg, Binyamina (IL); Blaise Aguera-Arcas, Seattle, WA (US); Benjamin Schlesinger, Ramat Hasharon (IL); Brandon Barbello, Mountain View, CA (US); Ori Kabeli, Yehud (IL); David Petrou, Brooklyn, NY (US); Yossi Matias, Tel Aviv (IL); Nadav Bar, Tel Aviv (IL)

(73) Assignee: Google LLC, Mountain View, CA (US)

( * ) Notice: Subject to any disclaimer, the term of this patent is extended or adjusted under 35 U.S.C. 154(b) by 170 days.

(21) Appl. No.: 16/771,630

(22) PCT Filed: May 9, 2019

(86) PCT No.: PCT/US2019/031614
§ 371 (c)(1),
(2) Date: Jun. 10, 2020

(87) PCT Pub. No.: WO2019/231631
PCT Pub. Date: Dec. 5, 2019

(65) Prior Publication Data
US 2020/0358901 A1 Nov. 12, 2020

Related U.S. Application Data

(60) Provisional application No. 62/677,477, filed on May 29, 2018.

(51) Int. Cl.
*H04M 3/527* (2006.01)
*G06N 20/00* (2019.01)
(Continued)

(52) U.S. Cl.
CPC ............ *H04M 3/527* (2013.01); *G06N 20/00* (2019.01); *G06Q 10/1095* (2013.01);
(Continued)

(58) Field of Classification Search
CPC ............ H04M 3/527; H04M 3/42357; H04M 3/42374; H04M 3/4365; H04M 1/72454;
(Continued)

(56) References Cited

U.S. PATENT DOCUMENTS 8,331,539 B2 12/2012 Eckel et al.
9,043,602 B1 5/2015 Krieger et al.
(Continued)

FOREIGN PATENT DOCUMENTS

CN 1859742 11/2006
CN 102065368 5/2011
(Continued)

OTHER PUBLICATIONS

"Search Report", European Application No. 16821853.5, dated Feb. 1, 2019, 14 pages.
(Continued)

*Primary Examiner* — Akelaw Teshale
(74) *Attorney, Agent, or Firm* — McDonnell Boehnen Hulbert & Berghoff LLP

(57) ABSTRACT

Methods, systems, and apparatus, including computer programs encoded on a computer storage medium, for receiving, at a mobile computing device that is associated with a called user, a call from a calling computing device that is associated with a calling user; in response to receiving the call, determining, by the mobile computing device, that data associated with the called user indicates that the called user will not respond to the call; in response to determining that the called user will not respond to the call, inferring, by the mobile computing device, an informational need of the (Continued)

calling user; and automatically providing, from the mobile computing device to the calling computing device, information associated with the called user and that satisfies the inferred informational need of the calling user.

20 Claims, 3 Drawing Sheets

(51) Int. Cl.
  *G06Q 10/1093* (2023.01)
  *G10L 15/08* (2006.01)
  *G10L 15/22* (2006.01)
  *H04M 3/42* (2006.01)
  *H04M 3/436* (2006.01)

(52) U.S. Cl.
  CPC ............. *G10L 15/08* (2013.01); *G10L 15/22* (2013.01); *H04M 3/42357* (2013.01); *H04M 3/42374* (2013.01); *H04M 3/4365* (2013.01); *G10L 2015/088* (2013.01); *G10L 2015/223* (2013.01)

(58) Field of Classification Search
  CPC .. H04M 3/4872; H04M 1/64; H04M 3/42102; H04M 3/436; G06N 20/00; G06Q 10/1095; G10L 15/08; G10L 15/22; G10L 2015/088; G10L 2015/223
  See application file for complete search history.

(56) References Cited

U.S. PATENT DOCUMENTS

| | | | | |
|---|---|---|---|---|
| 9,241,059 | B2* | 1/2016 | Scott | H04M 3/436 |
| 2004/0235462 | A1* | 11/2004 | Lasken | H04W 4/12 |
| | | | | 455/445 |
| 2008/0247529 | A1 | 10/2008 | Barton et al. | |
| 2011/0195699 | A1* | 8/2011 | Tadayon | H04W 48/02 |
| | | | | 455/418 |
| 2014/0024347 | A1* | 1/2014 | Carter | H04M 1/72463 |
| | | | | 455/575.9 |
| 2014/0118465 | A1 | 5/2014 | Scott et al. | |
| 2014/0171044 | A1 | 6/2014 | Liang et al. | |
| 2015/0201313 | A1* | 7/2015 | Celik | H04M 1/72436 |
| | | | | 455/414.1 |
| 2016/0127534 | A1* | 5/2016 | Celik | H04M 1/724 |
| | | | | 455/566 |
| 2017/0289772 | A1* | 10/2017 | Kim | B60W 50/0097 |
| 2018/0183920 | A1* | 6/2018 | Celik | H04M 1/72436 |

FOREIGN PATENT DOCUMENTS

| | | | | |
|---|---|---|---|---|
| CN | 104767860 | | 7/2015 | |
| CN | 105009556 | | 10/2015 | |
| EP | 2817937 | | 12/2014 | |
| EP | 2974249 | | 1/2018 | |
| JP | 2017017545 | A * | 1/2017 | |
| WO | WO-2014164304 | A1 * | 10/2014 | .......... H04M 3/4872 |
| WO | WO-2017123211 | A1 * | 7/2017 | ............ H04L 51/02 |
| WO | 2019231631 | | 12/2019 | |

OTHER PUBLICATIONS

"International Search Report and Written Opinion", PCT Application No. PCT/US2019/031614, dated Aug. 8, 2019, 13 pages.
"Foreign Office Action", CN Application No. 201980011480.2, dated Aug. 12, 2021, 31 pages.
"Foreign Office Action", CN Application No. 201980011480.2, dated Jan. 19, 2021, 34 pages.
"International Preliminary Report on Patentability", Application No. PCT/US2019/031614, dated Dec. 10, 2020, 8 pages.

* cited by examiner

AUTOMATICALLY PERFORMING ACTIONS BY A MOBILE COMPUTING DEVICE

FIELD

The present specification relates to automation of processes performed by a mobile computing device.

BACKGROUND

Users of mobile computing devices may not be available to (or prefer not to) answer calls as they are received—the users may be driving, in meetings, or otherwise unavailable. However, the calling user may need to interact with the called user while the called user is unavailable.

Therefore, there may be required a method and system for improving safety when using mobile devices and telephones, especially when driving. There may also be a further requirement to improve the automation of the operation of a user interface of a mobile device. This may improve its usability and functionality in various situations and scenarios.

SUMMARY

Systems and methods for performing actions automatically when a user of a mobile computing device is unavailable to take the call, are described. Specifically, a called user is associated with a mobile computing device (e.g., a smartphone, smart watch, or other smart device. The mobile computing device receives a call from a calling user from a calling computing device, such as a smartphone, smart watch, landline telephone, Voice over Internet Protocol (VoIP) phone, or other computing device configured to initiate a telephone call. The mobile computing device determines, in response to receiving the call from the called user, that data associated with the called user indicates that the called user will not respond to the call—for example, the called user is unable to "answer" the call of the calling user, or prefers not to "answer" the call. For example, the called user may be busy, driving, or otherwise unavailable to attend to the call of the calling user.

The mobile computing device can determine that the called user will not respond to the call by a variety of methods. For example, the mobile computing device can access calendar data, location data, e-mail data, social media data and/or networking data associated with the called user to determine that the called user is "busy"—e.g., the user is currently at an appointment scheduled on the calendar at the time at which the calling user is calling. The mobile computing device can further access accelerometer or GPS data to determine that the called user is driving and will not respond to the call, and/or access microphone data to determine the user is conversing with other users (e.g., in a business meeting) and will not to respond to the call. In some examples, the user sets a parameter (e.g., a do not disturb selectable user interface element) associated with the mobile computing device to indicate that the user will not respond to the call (e.g., that the called user is unable to respond to the call or prefers not to respond to the call). The parameter can be set globally (e.g., for all calls) or on an individual call basis.

The mobile computing device, in response to determining that the called user will not respond to the call, can infer an informational need of the calling user. For example, the mobile computing device can infer that the informational need of the calling user is a current location of the called user, or an estimated time of arrival of the called user to the calling user. The informational need of the calling user can be determined by processing audio data provided by the calling user, such as by applying machine learning to the audio data. Other examples of informational needs of the calling user can include providing the calling user with scheduling/calendaring data associated with the called user. In some examples, prior to the mobile computing device inferring the informational need of the calling user, the mobile computing device can notify the calling computing device that the called user will not respond to the call. In response, the calling user can provide audio data (e.g., voice data) to the mobile computing device through the calling computing device that can facilitate inferring the informational need of the calling user.

The mobile computing device can automatically provide to the calling computing device information that is associated with the called user that satisfies the inferred informational need of the calling user. Providing the information can include providing a current location of the called user, or the estimated time of arrival of the called user to the calling user. In some cases, a task can be performed at the mobile computing device based on the informational need, such as adding an appointment to the calendar associated with the called user or adding a task to a task-management application associated with the called user. In some cases, the task can be marked for execution at a particular (later) time or a particular situation based on the informational need.

Innovative aspects of the subject matter described in this specification may be embodied in methods that include the actions of receiving, at a computing device that is associated with a called user, a call from a calling computing device that is associated with a calling user; in response to receiving the call, determining, by the computing device, that data associated with the called user indicates that the called user will not respond to the call; in response to determining that the called user will not respond to the call, inferring, by the computing device, an informational need of the calling user; and automatically providing, from the computing device to the calling computing device, information associated with the called user and that satisfies the inferred informational need of the calling user.

Therefore, the safety and usability of a mobile device may be improved, especially (but not exclusively) when driving. The automation of the operation of the user interface may also be improved. Functionality of the mobile device may also be improved under various situations and scenarios.

Other embodiments of these aspects include corresponding systems, apparatus, and computer programs, configured to perform the actions of the methods, encoded on computer storage devices.

These and other embodiments may each optionally include one or more of the following features. For instance, after determining that the data associated with the user indicates that the user will not respond to the call, receiving audio data from the calling computing device, wherein inferring the informational needs of the caller includes processing the audio data to identify the informational need of the caller. Processing the audio data further includes determining a textual representation of the audio data; matching one or more textual snippets of the textual representation with one or more keywords of a data store; and identifying the informational need that is associated with the matched keywords in the data store. Processing the audio data further includes applying machine learning to the audio data to identify the informational need of the calling user. In response to inferring the informational need of the calling user, performing a task at the mobile computing device based on the informational need. The task includes adding a calendar appointment within a calendaring application of the mobile computing device based on I) the informational need of the calling user and ii) a current state of the calendaring application. The task includes adding a task within a task-management application of the mobile computing device based on the informational need of the caller. The inferred informational need of the calling user is a current location associated with the called user, wherein automatically providing the information that satisfies the informational need of the caller includes providing the current location associated with the called user to the calling computing device. The inferred informational need of the calling user is an estimated time of arrival of the called user to a location of the calling user, the method further including accessing a location application of the mobile computing device to determine a current location of the called user; receiving the location of the calling user; and comparing the current location of the called user and the location of the calling user to determine the estimated time of arrival of the called user to the location of the calling user. The location application of the mobile computing device is accessed independent of user input. In response to receiving the location of the calling user, setting, by the location application of the mobile computing device, the location of the calling user as a target destination location independent of user input. Providing the current location of the called user to the calling computing device.

Features further include automatically providing the information that satisfies the informational need of the caller is performed independent of user interaction with the mobile computing device by the called user. Providing the information that satisfies the informational need of the calling user includes providing an audio signal to the calling computing device that includes the information that satisfies the informational need of the calling user. Determining that the data associated with the user indicates that the called user will not respond to the call includes accessing at least one of calendar metadata, location metadata, e-mail metadata, and social networking data associated with the called user and accelerometer data and microphone data of the mobile computing device; processing one or more of the calendar metadata, the location metadata, the e-mail metadata, the social networking data, the accelerometer data, and the microphone data to determine that the user will not respond to the call; and in response to the processing, determining that the user will not respond to the call. Processing one or more of the calendar metadata, the location metadata, the e-mail metadata, and the social networking data includes identifying an event associated with the called user from one or more of the calendar metadata, the e-mail metadata, and the social networking data; identifying a time window associated with the event; determining that a time when the call was received coincides with the time window; and in response to determining that a time when the call was received coincides with the time window, determining that the user will not respond to the call. In response to determining that the user will not respond to the call, providing a portion of the calendar metadata to the calling computing device. Processing the accelerometer data of the mobile computing device includes determining, based on the accelerometer data of the mobile computing device, that the called user is driving, and in response, determining that the user will not respond to the call. Processing the microphone data of the mobile computing device includes identifying, based on the microphone data of the mobile computing device, one or more audio signals associated with one or more other individuals, and in response, determining that the user will not respond to the call.

Innovative aspects of the subject matter described in this specification may be embodied in methods that include the actions of receiving at a mobile device an incoming call from a caller to a called user; determining that the called user will not answer the call based on information available at the mobile device; answering the call by the mobile device; receiving caller information at the mobile device during the call; determining a response to the caller based on the received caller information and data available at the mobile device; and providing the response to the caller.

Other embodiments of these aspects include corresponding systems, apparatus, and computer programs, configured to perform the actions of the methods, encoded on computer storage devices.

These and other embodiments may each optionally include one or more of the following features. For instance, the caller information is received as audio data during the call. The step of answering the call by the mobile device further comprises muting a speaker of the mobile device and answering the call without activating a display of the mobile device. The caller information received at the mobile device during the call is received as audio data. The response to the caller is provided as audio data during the call. The response is any one or more of the location of the called user, the schedule of the called user, and an indication when the called user will answer a call. The step of determining from the received caller information an urgency level and if above a predetermined urgency level then initiating an alert on the mobile device. The alert is an audio and/or a visual alert. The received caller information include one or more keywords and the step of determining an urgency level is based on one or matching the one or more keywords with one or more associated urgency levels. The information available at the mobile device includes any one or more of a do not disturb setting, calendar data, mode of transport data, and expiry of a call ringing period.

Particular implementations of the subject matter described in this specification can be implemented so as to realize one or more of the following advantages. For example, implementations of the subject matter provide for the efficient usage of computer resources by automating tasks that are performed by a mobile computing device without interaction by a user of the mobile computing device. Thus, extra processing steps may be avoided included processing steps related to notifying the user of such tasks, waiting for input from the user, and subsequently notifying the user of performance of such tasks. This provides a streamlined use of computer resources of the mobile computing device, minimizing processing steps while performing the same tasks that otherwise would be performed with additional processing steps if there were input by the user. This additionally reduces usage of memory of the mobile computing device as inputs by the user are not needed to be stored for subsequent action as the actions are performed automatously by the mobile computing device.

The inference of an informational need of the caller also enables the system to provide, to the calling user, information associated with the called user that satisfies the inferred informational need of the calling user. This is an unconventional processing step that enables the selection of, or generation of, information to provide to the calling user without an explicit request by the calling user.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
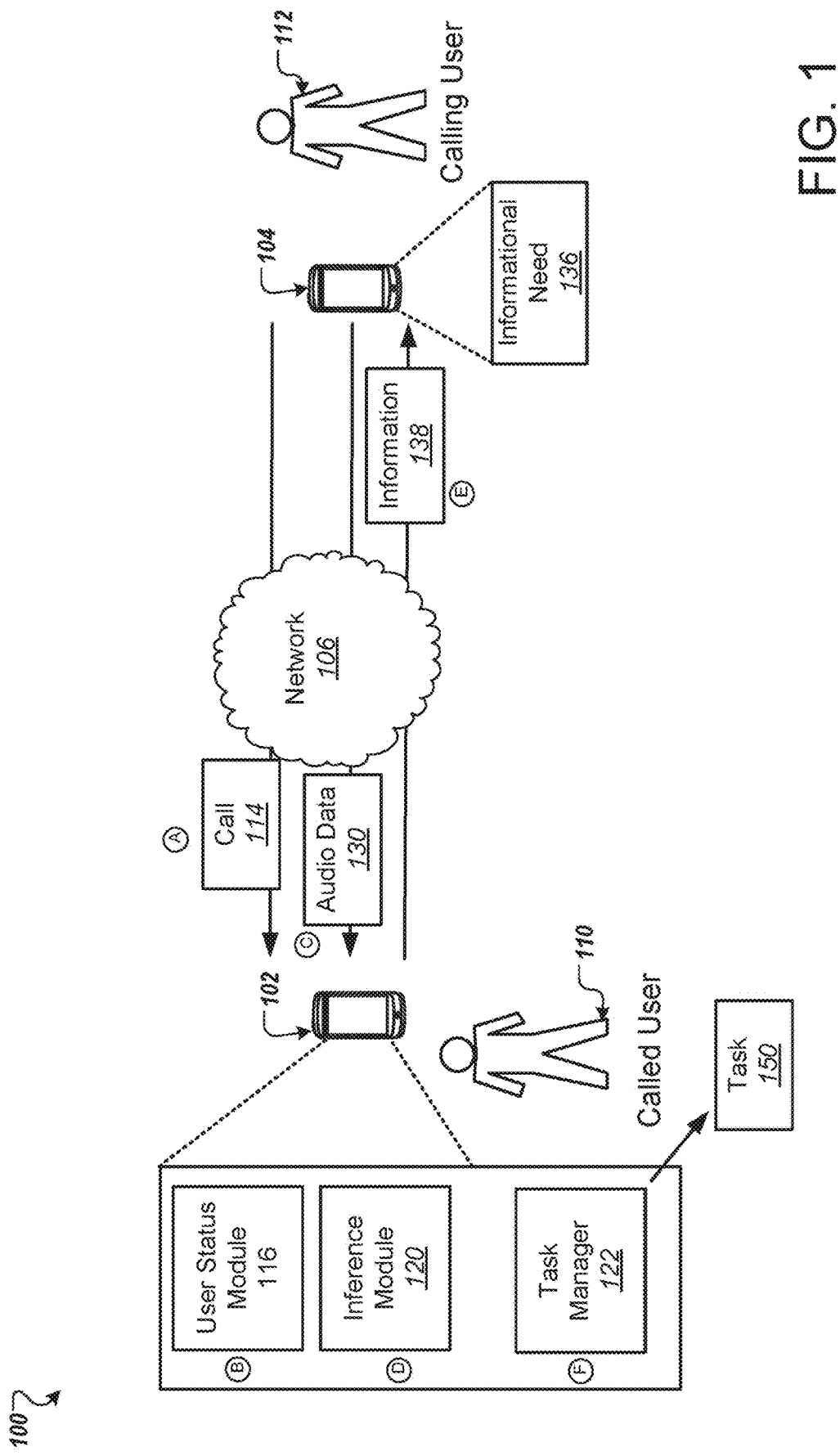
FIG. 1 depicts a system for performing actions automatically when a called user is unavailable.

FIG. 1 depicts a system 100 for performing actions automatically when a called user is determined to be unavailable. The system 100 includes a mobile computing device 102, a calling computing device 104, and a network 106. The mobile computing device 102 is in communication with the calling computing device 104 over the network 106. The mobile computing device 102 can be associated with a called user 110, and the calling computing device 104 can be associated with a calling user 112. In some examples, the mobile computing device 102 and the calling computing device 104 can be any type of computing device. The mobile computing device 102 can include a user status module 116, an inference module 120, and a task manager 122.

The mobile computing device 102 receives a call 114 from the calling computing device 104, at step A. Specifically, the mobile computing device 102 receives data from the calling computing device 104 over the network 106, the data including a telephonic call from the calling computing device 104. In other words, the mobile computing device 102 receives an incoming call 114 that is from the calling user 112 to the called user 110.

The mobile computing device 102 determines, in response to receiving the call 114, that data associated with the called user 110 indicates that the called user 110 will not respond to the call 114, at step B. Specifically, the user status module 116 accesses data associated with the called user 110 and/or the mobile computing device 102, processes such data, and in response, determines that the called user 110 will not respond to the call 114.

In some embodiments, determining, by the user status module 116, that the called user 110 will not respond to the call 114 (e.g., the computing device arriving at a determination that the called user 110 will be unable to respond to the call 114 or prefers not to respond to the call 114) by accessing one or more of calendar metadata, location metadata, e-mail metadata, and social networking data associated with the called user 110; and/or accessing one or more of accelerometer data and microphone data of the mobile computing device 102. In some examples, the calendar metadata, location metadata, e-mail metadata, and social networking data is stored by the mobile computing device 102, and/or the user status module 116 accesses such data over the network 106. The user status module 116 can process one or more of the calendar metadata, the location metadata, the e-mail metadata, the social networking data, the accelerometer data, and the microphone data to determine that the user will not respond to the call; and in response to such processing, determine that the called user 110 will not respond to the call 114.

In some examples, the user status module 116 determines that the called user 110 will not respond to the call 114 based on an identity of the calling user 112. For example, the user status module 106 can process the contacts associated with the called user 110 and/or the mobile computing device 102, and based on parameters associated with the contacts, determine that the called user 110 will not respond to the call 114. For example, the calling user 112 is associated with a contact stored by the mobile computing device 112 that is associated with data indicating that the called user 110 will not respond to calls from the calling user 112. Additionally, in some examples, a subset of the contacts associated with the called user 110 and/or the mobile computing device 102 can be associated with data indicating that the called user 110 will respond.

In some examples, processing, by the user status module 116, of the calendar metadata, the location metadata, the e-mail metadata, and the social networking data can include identifying an event associated with the called user 110 from one or more of the calendar metadata, the e-mail metadata, and the social networking data. For example, such metadata and data can indicate an event the called user 110 is scheduled to attend. The user status module 116 can further identify a time window associated with the event, and determine that a time when the call 114 was received by the mobile computing device 102 coincides with the time window. The user status module 116 can, in response to determining that the time when the call 114 was received coincides with the time window of the event, determine that the called user 110 will not respond to the call 114.

In some examples, processing, by the user status module 116, the accelerometer data of the mobile computing device 102 can include determining, by the user status module 116 and based on the accelerometer data, that the called user 110 is driving. In response to determining that the called user 110 is driving, the user status module 116 determines that the called user 110 will not respond to the call 114. For example, the accelerometer data can indicate a rate of speed that the called user 110 is currently moving, and based solely on such data or in combination with other data (such as the calendar metadata, the location metadata, the e-mail metadata, and the social networking data), the user status module 116 can determine the called user 110 is driving (e.g., driving a motor vehicle). Determining that the user is driving based on accelerometer data may conserve computing resources, network resources and energy resources compared to determining that the user is driving by other methods, e.g. by using a global positioning system/or mapping system of the mobile computing device 102. Still, in some examples, the above-discussed determination that the user 110 is driving is performed based on information received from satellites of a global positioning system and/or information received from cellular towers (e.g., cell-ID location determinations).

In some examples, processing, by the user status module 116, the microphone data of the mobile computing device 102 can include identifying, by the user status module 116 and based on the microphone data, audio signals associated with one or more other individuals. In response to identifying the other audio signals, the user status module 116 determines that the called user 110 will not respond to the call 114. For example, the microphone data can indicate that other individuals are proximate to the called user 110 and the mobile computing device 102, and that the called user 110 may be actively engaged in a conversation with the other users (e.g., the called user 110 is in a business meeting or social environment with the other individuals). The user status module 116 can determine, based solely on the microphone data or in combination with other data (such as the calendar metadata, the location metadata, the e-mail metadata, and the social networking data), that the called user 110 will not respond to the call 114. Determining that the user will not respond based on the microphone data may conserve computing resources, energy resources and network resources compared with other methods. In some examples, the user status module 116 can determine that the called user 110 will not respond to the call 114 utilizing machine learning models at the mobile computing device 102 using a combination of signals (e.g., the microphone data, calendar metadata, the location metadata, the e-mail metadata, and the social networking data) to predict whether the called user 110 will respond to the call 114.

In some examples, the user status module 116 determines that the called user 110 will not answer the call 114 based on information available at the mobile computing device 102. For example, the information can include a do-not-disturb setting of the mobile computing device 102 being set or activated, calendar data, mode of transport data, and an expiry of a call ringing period. In some examples, the user status module 116 determines that the called user 110 will not respond to the call 114 based a state of a do-not-disturb parameter (flag) associated with the mobile computing device indicating that the user will not respond to the call. For example, the user can adjust a status of a do not disturb selectable user interface element to indicate that the user will or will not respond to the call. The parameter can be set globally (e.g., for all calls) or on an individual call basis (e.g., after the mobile computing device displays an indication of the incoming call).

In some examples, after determining that the data associated with the called user 110 indicates that the called user 110 will not respond to the call 114, the mobile computing device 102 automatically answers the call 114. In some examples, the mobile computing device 102 answers the call 114 independent of action by the called user 110. In some examples, answering the call 114 by the mobile computing device 102 can include muting a speaker of the mobile computing device 102, muting a microphone of the mobile computing device 102, and/or answering the call 114 without activating a display of the mobile computing device 102. In some examples, answering the call 114 automatically by the mobile computing device 102 can include performing actions on behalf of the called user 110, as described further herein.

The mobile computing device 102, after determining that the data associated with the called user 110 indicates that the called user 110 will not respond to the call 114, receives audio data 130 from the calling computing device 104, e.g., over the network 106, at step C. In some examples, the mobile computing device 102 can provide data to the calling computing device 104 over the network 106 that indicates that the called user 110 will not respond to the call 114. For example, the provided data can include audio data that indicates that the called user 110 will not to respond to the call 114, and/or can include textual data (e.g., text message or push notification) that the called user 110 will not respond to the call 114. In response to receiving such provided data that indicates that the called user 110 will not respond to the call 114, the calling computing device 104 provides the audio data 130 to the mobile computing device 102. The audio data 130 can include data provided by the calling user 112, such as through a microphone of the calling computing device 104. In some examples, the calling computing device 104 provides other non-audio data in addition to the audio data 130 to the mobile computing device 102 (e.g., when the calling computing device 104 is a "smart" device such as a mobile computing device).

The mobile computing device 102, and in particular, the inference module 120, in response to determining that the called user 110 will not respond to the call 114, infers an informational need 136 of the calling user 112, at step D. An informational need 136 of a calling user can be inferred from data associated with the calling user and/or data associated with the called user. Such data defines various contexts that are determined by the inference module 120, and the inference module 120 makes the inference based on the data and contexts. The inference module 120 can be machine learned or rule based (e.g., intent extract models using such techniques as long short-term memory (LSTM)). In the case of machine learning, training data may be used and the machine learning may be supervised. For example, a calling user may have an appointment with a location of the calling user's address, and the called user may have an application (e.g., a mapping application) open indicating the called user is en route to the calling user's address. By use of supervised learning, the inference module 120 may learn that the informational need is one or more of a time of arrival of the calling user or current location of the called user.

More specifically, training data sets may be generated for a variety of different situations—e.g., meetings at which both the calling and called user are to be present; meetings at which only the called or calling user is to be present; situations in which the calling user is calling a called user while the called user is driving; and so on. Each situation may be designed with one or more informational needs to be inferred, and the inference module may learn the desired inferences.

An informational need 136 may be satisfied by particular information responsive to the informational need 136. The inference module 120 is trained to identify and provide data responsive to the informational need 136, or accesses rules that define particular data to provide for particular informational needs. For example, when a calling user is calling a called user that is driving, the informational need 136 of the calling user 112 may be determined to be a current location of the called user and the estimated time of arrival. Thus, the informational need 136 can be satisfied by data that includes a current location associated with the called user 110, or an estimated time of arrival of the called user 110 to a location of the calling user 112. Other examples of the informational need 136 are also possible depending on the application desired.

In some examples, inferring the informational need of the calling user 112 by the inference module 120 can include processing the audio data 130 to identify the informational need 136 of the calling user 112. For example, the inference module 120 can include an audio processor. The inference module 120 can determine a textual representation of the audio data 130, and match textual snippets of the audio data 130 with keywords of a data store (not shown). The inference module 120 can then identify the informational need 136 that is associated with the matched keywords in the data store. In some examples, the inference module 120 can infer the informational need of the calling user 112 by applying machine learning to the audio data 130 (such as applying artificial neural networks or deep learning). In some examples, the informational need of the calling user 112 is inferred by the inference module 120 independent of input by the calling user 112. In some examples, the information need of the calling user 112 is inferred by the inference module 120 individually.

The mobile computing device 102 automatically provides to the calling computing device 104 information 138 associated with the called user 110 that satisfies the inferred informational need 136 of the calling user 112 over the network 106, at step E. For example, the mobile computing device 102 determines a response to the call 114 and the calling user 112 based on the received audio data 130 (e.g., caller information) and the data available at the mobile computing device 102 (e.g., the calendar metadata, the location metadata, the e-mail metadata, the social networking data, the accelerometer data, and the microphone data). The information 138 can include audio (e.g., generated speech), video, textual or any type of data that satisfies the informational need 136 of the calling user 112. For example, when the informational need 136 includes a current location of the called user 110, the mobile computing device 102 can automatically provide to the calling computing device 104 the information 138 that includes the current location of the called user 110. In some examples, the information 138 is provided only after determining, by the mobile computing device 102, that authorization to give such information is permitted (e.g., an authorization flag is set). For example, the called user 110 sets parameters associated with providing the information 138, e.g., a time frame for providing the information 138, a set of contacts to provide the information 138 to, a subset of all of the information accessible by the mobile computing device 102 to provide.

In some examples, the mobile computing device 102 automatically provides the current location associated with the called user 110 to the calling computing device 104. That is, the mobile computing device 102 determines that the informational need 136 of the calling user 112 includes a current location associated with the called user (e.g., based on processing the audio data 130). For example, the mobile computing device 102 determines that the called user 110 is driving (as described herein), and further determines that the informational need 136 of the calling user 112 includes a current location of the called user 110. In response to such, the mobile computing device 102 can automatically provide the current location of the called user 110 to the calling computing device 104.

In some examples, the mobile computing device 102 can access a location application of the mobile computing device 102 to determine the current location of the called user 110. For example, the mobile computing device 102 can determine the current location of the called user 110 by a GPS receiver, cell triangulation, and/or an accelerometer. Further, the mobile computing device 102 can receive the location of the calling user 112, and compare the current location of the called user 110 and the calling user 112 to determine the estimated time of arrival of the called user 110 to the location of the calling user 112. The location application of the mobile computing device 102 can be accessed independent of user interaction.

In some examples, the mobile computing device 102 automatically provides information 138 that satisfies the informational need 136 of the calling user 112 independent of user interaction with the mobile computing device 102 by the called user 110. That is, the mobile computing device 102 is able to i) receive the call 114 from the computing device 104, ii) determine that the called user 110 will not respond to the call 114, iii) infer the informational need 136 of the calling user 112, and iv) provide the information 138 to the calling computing device 104 without user interaction by the called user 110 with the mobile computing device 102.

In some examples, the information 138 that the mobile computing device 102 provides to the calling computing device 104 includes audio data that satisfies the informational need 136 of the calling user 112. For example, when the informational need 136 includes a current location of the called user 110, the audio data of the information 138 can include audio data conveying the location of the called user 110.

In some examples, the information 138 that the mobile computing device 102 provides to the calling computing device 104 can include a portion of the calendar metadata that is associated with the called user 110. For example, when the informational need 136 includes scheduling of an appointment for the called user 110 by the calling user 112, the mobile computing device 102 can automatically provide a relevant portion of the calendar metadata (e.g., a portion surrounding a date associated with the informational need 136) to the calling computing device 104. In some examples, the calling computing device 104 can provide additional data back to the mobile computing device 102 over the network 106 in response to receiving the portion of the calendar metadata. For example, the additional data can include an appointment to be associated with the calendar metadata of the called user 110 within the mobile computing device 102 (e.g., using deep learning dialogue).

In some examples, the information 138 that the mobile computing device 102 provides to the calling computing device 104 can include data indicating when the called user 110 will answer/respond to the call 114. For example, based on the calendar metadata associated with the called user 110 or a determined length of a current driving route, the mobile computing device 102 can determine an availability of the called user 110. The mobile computing device 102 can provide such availability in the information 138 that is provided to the calling computing device 104. For example, the information 138 can indicate when the next opening is associated with the calendar metadata associated with the called user 110, and that the called user 100 will respond appropriately at the next opening.

In some examples, the mobile computing device 102, and specifically, the task manager 122, in response to inferring the informational need 136 of the calling user 112, performs a task 150 at the mobile computing device 102 based on the informational need 136, at step F. That is, the task manager 122 can add a task within a task-management application of the mobile computing device 102 based on the informational need 136 of the calling user 112. For example, the informational need 136 can be associated with a task such as "call calling user 112 back." The task manager 122 can add the task 150 to the task-management application of the mobile computing device 102 that is related to "call calling user 112 back." The task 150 can further include information related to the informational need 136. As mentioned herein, the informational need 136 of the calling user 112 can include a current location associated with the called user 110. In some examples, the task 160 can include setting, by the location application of the mobile computing device 102, the location of the calling user 112 as a target destination location of the called user 110 independent of user input.

In some examples, the task manager 122 can add the task 150 for later execution by the mobile computing device 102. For example, the task 150 can be performed at a particular time or a particular situation based on the informational need 136. For example, the task 150 can be related to "call calling user 112 back at 5 pm," "call calling user 112 when the called user 110 leaves current location," or "notify calling user 112 when called user's battery is less than 10%."

As mentioned herein, the calling computing device 104 provides audio data 130 and/or other non-audio data to the mobile computing device 102. In some further examples, the audio data 130 and/or other non-audio data can indicate an urgency level. That is, the calling user 112 can indicate an urgency level associated with the call 114—e.g., urgent or non-urgent (or levels of granularity of urgency). In response to receiving the audio data 130 and/or other non-audio data from the calling computing device 104, the mobile computing device 102 can process the data indicating the urgency level, and if the urgency level is above a predetermined urgency level associated with the mobile computing device 102, initiating an alert on the mobile computing device 102. In some examples, the alert can include an audio and/or a visual alert provided by the mobile computing device 102. In some examples, the audio data 130 and/or other non-audio data that indicates the urgency level can include one or more keywords. The mobile computing device 102 can match the one or more keywords that indicate the urgency level with one or more associated urgency levels (e.g., as stored by a data store) and determine the urgency level based upon such matching. In some examples, the mobile computing device 102 can determine the urgency level by applying machine learning to the audio data 130 (such as applying artificial neural networks or deep learning). For example, a model can be trained on text transcripts that labeled with urgency, and using this model to infer the urgency level of a transcription of the audio data 130. A further example can include analyzing sentiment from the audio data 130 using various characteristics (e.g., frequency, speed) to infer the urgency level of the audio data 130.

Figure 2:
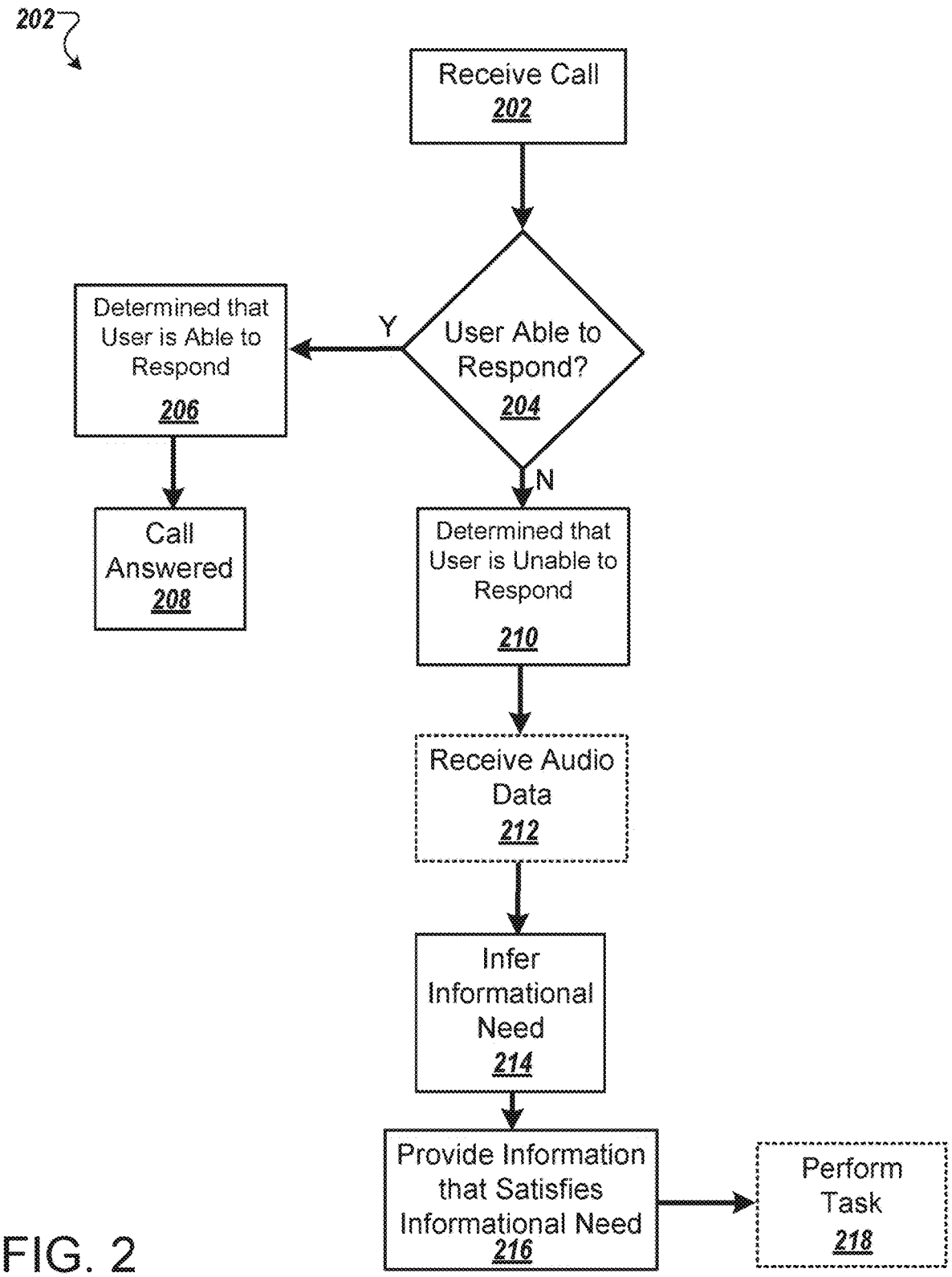
FIG. 2 depicts a flowchart of an example process for performing actions automatically when a called user is unavailable.

FIG. 2 depicts a flowchart of an example process 200 for performing actions automatically when the called user 110 is unavailable. The example process 200 can be executed using one or more computing devices. For example, the mobile computing device 102 and/or the calling computing device 104 can be used to execute the example process 200, but other computing systems could additionally or alternatively be used such as a cloud-based computing system that serves as an intermediary or supervisory system in the call. In some implementations, the operations described herein are performed for a text messaging session, for example, when a texting individual sends a message to a texted individual and the texted individual is unavailable. In such cases, a computing system may determine that the texted individual is unavailable (e.g., because the texted individual is driving) and can provide the texting individual a text notification indicating when the texted individual will be available or reach a location of the texting individual.

At 202, the mobile computing device 102 receives a call 114 from the calling computing device 104. At 204, the mobile computing device 102 determines whether the called user 110 is able to respond to the call 114. At 206, the mobile computing device 102 determines that data associated with the called user 110 indicates that the called user 110 is able to respond to the call 114. At 208, the mobile computing device 102 answers the call 114.

At 210, the mobile computing device 102 determines that data associated with the called user 110 indicates that the called user 110 will not respond to the call 114. Specifically, the user status module 116 accesses data associated with the called user 110 and/or the mobile computing device 102, processes such data, and in response, determines that the called user 110 will not respond to the call 114. Optionally at 212, the mobile computing device 102, after determining that the data associated with the called user 110 indicates that the called user 110 will not respond to the call 114, receives audio data 130 from the calling computing device 104. At 214, the mobile computing device 102, and in particular, the inference module 120, in response to determining that the called user 110 will not respond to the call 114, infers the informational need 136 of the calling user 112.

At 216, the mobile computing device 102 automatically provides to the calling computing device 104 information 138 associated with the called user 110 that satisfies the inferred informational need 136 of the calling user 112 over the network 106. Optionally, at 218, the mobile computing device 102, and specifically, the task manager 122, in response to inferring the informational need 136 of the calling user 112, performs a task 150 at the mobile computing device 102 based on the informational need 136.

Further to the descriptions above, a user may be provided with controls allowing the user to make an election as to both if and when systems, programs, or features described herein may enable collection of user information (e.g., information about a user's calls, text messages, locations, calendar appointments, etc.). A mobile computing device of a called user may only analyze information and respond to a calling user if the called user activates one or more settings that enable functionality described in this disclosure. A calling user may similarly have to activate one or more settings to enable such functionality and/or may have to consent to operation of the technology described in this disclosure in real-time during a call, for example, in response to a prompt that requests information from the calling user. In short, users may have control over what information is collected about the users, how that information is used, and what information is provided to the users.

Figure 3:
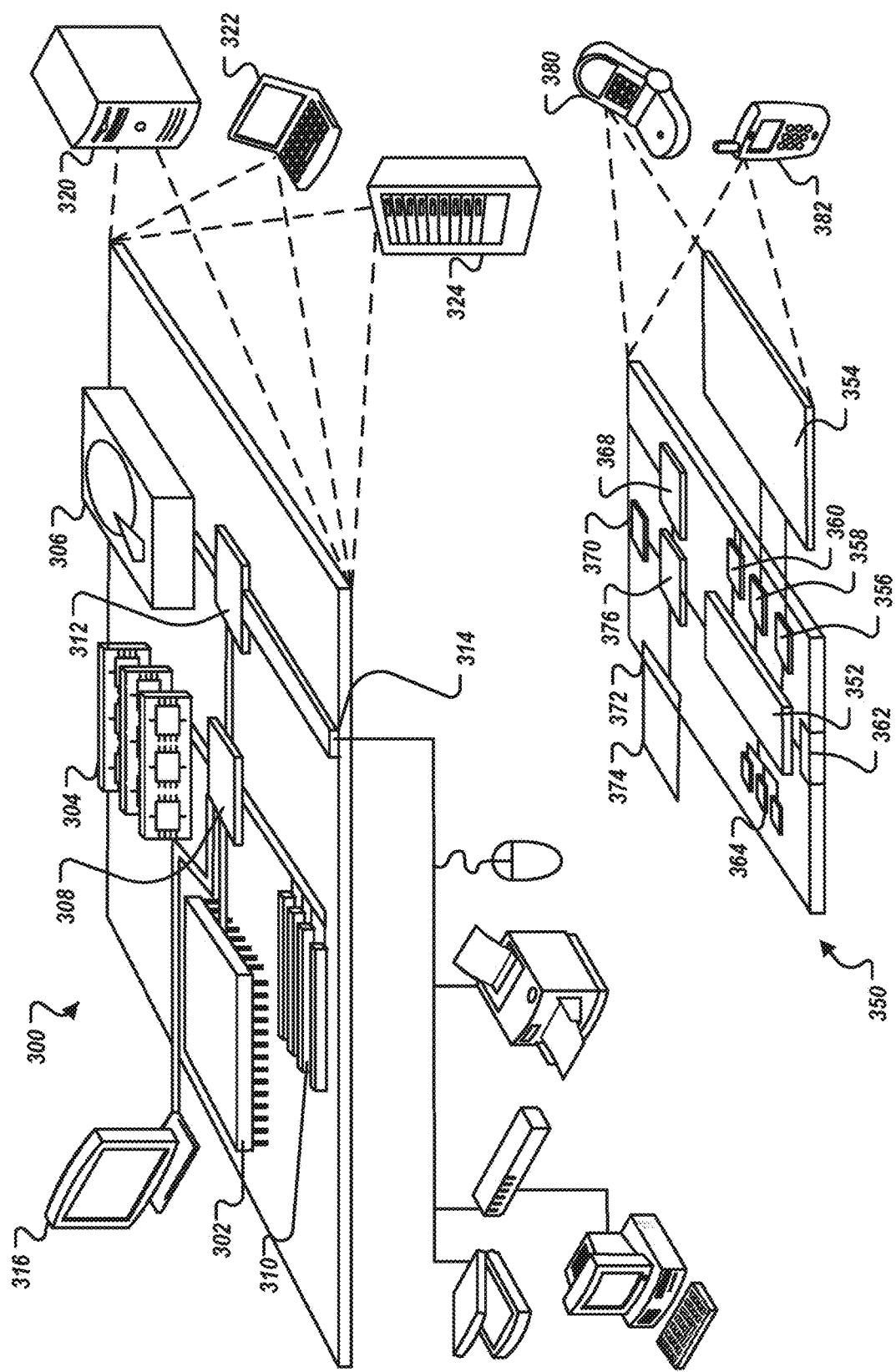
FIG. 3 depicts an example computing system and a mobile computing device that may be used to implement the techniques described herein.

FIG. 3 shows an example of a generic computer device 300 and a generic mobile computer device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 may process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 304, the storage device 306, or a memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). Where a graphics processor or accelerator (not shown) is included in the computing device 300, the graphics processor or accelerator may also be capable of applying and/or accelerating machine learning, such as artificial neural networks and/or deep learning. The graphics processor may be capable of applying machine learning in less time, or using fewer computational and/or energy resources. In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 may execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The display interface may include a graphics processor/accelerator. Where a graphics processor or accelerator (not shown) is included in the mobile computing device 350, the graphics processor or accelerator may also be capable of applying and/or accelerating machine learning, such as artificial neural networks and/or deep learning. The graphics processor may be capable of applying machine learning in less time, or using fewer computational and/or energy resources. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 may be implemented as one or more of a computer-readable medium or media, a volatile memory unit or units, or a non-volatile memory unit or units. Expansion memory 354 may also be provided and connected to device 350 through expansion interface 352, which may include, for example, a SIMM (Single Inline Memory Module) card interface. Such expansion memory 354 may provide extra storage space for device 350, or may also store applications or other information for device 350. For example, expansion memory 354 may include instructions to carry out or supplement the processes described above, and may include secure information also. Thus, for example, expansion memory 354 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 354, memory on processor 352, or a propagated signal that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 350 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Clause 1. A computer-implemented method, comprising: receiving, at a mobile computing device that is associated with a called user, a call from a calling computing device that is associated with a calling user; in response to receiving the call, determining, by the mobile computing device, that data associated with the called user indicates that the called user will not respond to the call; in response to determining that the called user will not respond to the call, inferring, by the mobile computing device, an informational need of the calling user; and automatically providing, from the mobile computing device to the calling computing device, information associated with the called user and that satisfies the inferred informational need of the calling user.

Clause 2. The method of clause 1, further comprising: after determining that the data associated with the user indicates that the user will not respond to the call, receiving audio data from the calling computing device, wherein inferring the informational needs of the caller includes processing the audio data to identify the informational need of the caller.

Clause 3. The method of clause 2, wherein processing the audio data further includes: determining a textual representation of the audio data; matching one or more textual snippets of the textual representation with one or more keywords of a data store; and identifying the informational need that is associated with the matched keywords in the data store.

Clause 4. The method of clause 2, wherein processing the audio data further includes applying machine learning to the audio data to identify the informational need of the calling user.

Clause 5. The method of any of clauses 1-4, further comprising in response to inferring the informational need of the calling user, performing a task at the mobile computing device based on the informational need.

Clause 6. The method of clause 5, wherein the task includes adding a calendar appointment within a calendaring application of the mobile computing device based on i) the informational need of the calling user and ii) a current state of the calendaring application.

Clause 7. The method of clause 5 or 6, wherein the task includes adding a task within a task-management application of the mobile computing device based on the informational need of the caller.

Clause 8. The method of any of clauses 1-7, wherein the inferred informational need of the calling user is a current location associated with the called user, wherein automatically providing the information that satisfies the informational need of the caller includes providing the current location associated with the called user to the calling computing device.

Clause 9. The method of any of clauses 1-8, wherein the inferred informational need of the calling user is an estimated time of arrival of the called user to a location of the calling user, the method further including: accessing a location application of the mobile computing device to determine a current location of the called user; receiving the location of the calling user; and comparing the current location of the called user and the location of the calling user to determine the estimated time of arrival of the called user to the location of the calling user.

Clause 10. The method of clause 9, wherein the location application of the mobile computing device is accessed independent of user input.

Clause 11. The method of clause 9 or 10, further comprising: in response to receiving the location of the calling user, setting, by the location application of the mobile computing device, the location of the calling user as a target destination location independent of user input.

Clause 12. The method of any of clauses 9-11, further comprising providing the current location of the called user to the calling computing device.

Clause 13. The method of any of clauses 1-12, wherein automatically providing the information that satisfies the informational need of the caller is performed independent of user interaction with the mobile computing device by the called user.

Clause 14. The method of any of clauses 1-13, wherein providing the information that satisfies the informational need of the calling user includes providing an audio signal to the calling computing device that includes the information that satisfies the informational need of the calling user.

Clause 15. The method of any of clauses 1-14, wherein determining that the data associated with the user indicates that the called user will not respond to the call comprises: accessing at least one of calendar metadata, location metadata, e-mail metadata, and social networking data associated with the called user and accelerometer data and microphone data of the mobile computing device; processing one or more of the calendar metadata, the location metadata, the e-mail metadata, the social networking data, the accelerometer data, and the microphone data to determine that the user will not respond to the call; and in response to the processing, determining that the user will not respond to the call.

Clause 16. The method of clause 15, wherein processing one or more of the calendar metadata, the location metadata, the e-mail metadata, and the social networking data includes: identifying an event associated with the called user from one or more of the calendar metadata, the e-mail metadata, and the social networking data; identifying a time window associated with the event; determining that a time when the call was received coincides with the time window; and in response to determining that a time when the call was received coincides with the time window, determining that the user will not respond to the call.

Clause 17. The method of clause 16, further including in response to determining that the user will not respond to the call, providing a portion of the calendar metadata to the calling computing device.

Clause 18. The method of any of clauses 15-17, wherein processing the accelerometer data of the mobile computing device includes: determining, based on the accelerometer data of the mobile computing device, that the called user is driving, and in response, determining that the user will not respond to the call.

Clause 19. The method of any of clauses 15-18, wherein processing the microphone data of the mobile computing device includes: identifying, based on the microphone data of the mobile computing device, one or more audio signals associated with one or more other individuals, and in response, determining that the user will not respond to the call.

Clause 20. The method of any of clauses 1-19, further comprising: receiving at a mobile device an incoming call from a caller to a called user; determining that the called user will not answer the call based on information available at the mobile device; answering the call by the mobile device; receiving caller information at the mobile device during the call; determining a response to the caller based on the received caller information and data available at the mobile device; and providing the response to the caller.

Clause 21. The method of clause 20, wherein the caller information is received as audio data during the call.

Clause 22. The method of clause 20 or 21, wherein the step of answering the call by the mobile device further comprises muting a speaker of the mobile device and answering the call without activating a display of the mobile device.

Clause 23. The method according to any of clauses 1-22, wherein the caller information received at the mobile device during the call is received as audio data.

Clause 24. The method according to any of clauses 1-23, wherein the response to the caller is provided as audio data during the call.

Clause 25. The method according to any of clauses 1-24, wherein the response is any one or more of: the location of the called user, the schedule of the called user, and an indication when the called user will answer a call.

Clause 26. The method according to any of clauses 1-25, further comprising the step of determining from the received caller information an urgency level and if above a predetermined urgency level then initiating an alert on the mobile device.

Clause 27. The method according to any of clauses 1-26, wherein the alert is an audio and/or a visual alert.

Clause 28. The method of any of clause 27, wherein the received caller information include one or more keywords and the step of determining an urgency level is based on one or matching the one or more keywords with one or more associated urgency levels.

Clause 29. The method according to any of clauses 1-28, wherein the information available at the mobile device includes any one or more of: a do not disturb setting, calendar data, mode of transport data, and expiry of a call ringing period.

Clause 30. A system comprising: one or more computers and one or more storage devices storing instructions that are operable, when executed by the one or more computers, to cause the one or more computers to perform any of the methods of clauses 1-29.

Clause 31. A non-transitory computer-readable medium storing software comprising instructions executable by one or more computers which, upon such execution, cause the one or more computers to perform any of the methods of clauses 1-29.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method, comprising:
   receiving, at a computing device that is associated with a called user, a call from a calling computing device that is associated with a calling user;
   in response to receiving the call, determining, by the computing device, that data associated with the called user indicates that the called user will not respond to the call;
   in response to determining that the called user will not respond to the call, inferring, by the computing device, based at least on data associated with the called user, an informational need of the calling user; and
   automatically providing, from the computing device to the calling computing device, information that is associated with the called user and that satisfies the inferred informational need of the calling user.

2. The computer-implemented method of claim 1, further comprising:
   in response to determining that the called user will not respond to the call, determining, by the computing device, one or more contexts that are defined by at least a part of data associated with the calling user and the data associated with the called user,
   wherein inferring, by the computing device, based at least on the data associated with the called user, the informational need of the calling user comprises inferring, by the computing device, based on the data associated with the calling user, the data associated with the called user, and the one or more contexts, the informational need of the calling user.

3. The computer-implemented method of claim 2, wherein the inferring, by the computing device, based on the data associated with the calling user, the data associated with the called user, and the one or more contexts, the informational need of the calling user is conducted by an inference module of the computing device.

4. The computer-implemented method of claim 3, wherein the inference module is a machine-learning model.

5. The computer-implemented method of claim 1, further comprising:
   after determining that the data associated with the called user indicates that the called user will not respond to the call, receiving audio data from the calling computing device, wherein inferring the informational need of the calling user includes processing the audio data as a further basis to identify the informational need of the calling user.

6. The computer-implemented method of claim 5, wherein processing the audio data further includes:
   determining a textual representation of the audio data;
   matching one or more textual snippets of the textual representation with one or more keywords of a data store; and
   identifying the informational need as a need that is associated with the matched one or more keywords in the data store.

7. The computer-implemented method of claim 6, wherein processing the audio data further includes applying machine learning to the audio data to identify the informational need of the calling user.

8. The computer-implemented method of claim 1, the method further comprising, in response to inferring the informational need of the calling user, performing a task at the computing device based on the inferred informational need of the calling user, wherein performing the task includes at least one of:
   adding, based on the inferred informational need of the calling user and a current state of a calendaring application, a calendar appointment within the calendaring application; or
   adding, based on the inferred informational need of the calling user, the task within a task-management application.

9. The computer-implemented method of claim 1, wherein the inferred informational need of the calling user is a current location associated with the called user,
   wherein automatically providing the information that satisfies the inferred informational need of the calling user includes providing the current location associated with the called user to the calling computing device.

10. The computer-implemented method of claim 1, wherein automatically providing the information that satisfies the inferred informational need of the calling user is performed independent of user interaction with the computing device by the called user.

11. The computer-implemented method of claim 1, wherein providing the information that satisfies the inferred informational need of the calling user includes providing an audio signal to the calling computing device that includes the information that satisfies the informational need of the calling user.

12. The computer-implemented method of claim 1, wherein the data associated with the called user that indicates the called user will not respond to the call comprises at least one of calendar metadata, location metadata, e-mail metadata, social networking data, accelerometer data, or microphone data that indicates the called user will not respond to the call.

13. The computer-implemented method of claim 12, further comprising:
   identifying, from one or more of the calendar metadata, the e-mail metadata, and the social networking data, an event associated with the called user;

identifying a time window associated with the event;

determining that a time when the call was received coincides with the time window; and in response to determining that the time when the call was received coincides with the time window, determining that the called user will not respond to the call.

14. The computer-implemented method of claim 13, further comprising:

in response to determining that the called user will not respond to the call, providing a portion of the calendar metadata to the calling computing device.

15. The computer-implemented method of claim 1, further comprising:

determining an urgency level of the call; and in response to determining the urgency level is above a predetermined urgency level, initiating an alert on the computing device.

16. A mobile computing device comprising at least one processor configured to perform operations comprising:

in response to receiving, at the mobile computing device that is associated with a called user, a call from a calling computing device that is associated with a calling user, determining that data associated with the called user indicates that the called user will not respond to the call;

in response to determining that the called user will not respond to the call, inferring, based at least on data associated with the called user, an informational need of the calling user; and automatically providing, from the mobile computing device to the calling computing device, information that is associated with the called user and that satisfies the inferred informational need of the calling user.

17. The mobile computing device of claim 16, wherein the operations further comprise:

in response to determining that the called user will not respond to the call, determining one or more contexts that are defined by at least a part of data associated with the calling user and the data associated with the called user, wherein inferring based at least on the data associated with the called user, the informational need of the calling user comprises inferring, based on the data associated with the calling user, the data associated with the called user, and the one or more contexts, the informational need of the calling user.

18. The mobile computing device of claim 17, wherein the inferring, based on the data associated with the calling user, the data associated with the called user, and the one or more contexts, the informational need of the calling user is conducted by an inference module of the mobile computing device.

19. A non-transitory computer-readable storage medium comprising instructions that, when executed, configure at least one processor of a mobile computing device to perform operations comprising:

in response to receiving, at the mobile computing device that is associated with a called user, a call from a calling computing device that is associated with a calling user, determining that data associated with the called user indicates that the called user will not respond to the call;

in response to determining that the called user will not respond to the call, inferring, based at least on data associated with the called user, an informational need of the calling user; and automatically providing, from the mobile computing device to the calling computing device, information that is associated with the called user and that satisfies the inferred informational need of the calling user.

20. The non-transitory computer-readable storage medium of claim 19, wherein the operations further comprise:

in response to determining that the called user will not respond to the call, determining one or more contexts that are defined by at least a part of data associated with the calling user and the data associated with the called user, wherein inferring based at least on the data associated with the called user, the informational need of the calling user comprises inferring, based on the data associated with the calling user, the data associated with the called user, and the one or more contexts, the informational need of the calling user.

* * * * *